United States Patent [19]

Okada

[11] 4,203,616
[45] May 20, 1980

[54] AIR BAG DEVICE FOR CARS

[75] Inventor: Motohiro Okada, Asaka, Japan

[73] Assignee: Honda Giken Kogyo Kabushiki Kaisha, Tokyo, Japan

[21] Appl. No.: 854,337

[22] Filed: Nov. 23, 1977

[30] Foreign Application Priority Data

Aug. 2, 1977 [JP] Japan .................................. 52/12882

[51] Int. Cl.² .................................................. B60R 21/08
[52] U.S. Cl. ...................................... 280/737; 137/70; 222/3
[58] Field of Search ............... 280/736, 737, 741, 742; 137/67, 68 R, 68 A, 69, 70, 71; 222/3

[56] References Cited

U.S. PATENT DOCUMENTS

| | | |
|---|---|---|
| 3,095,901 | 7/1963 | Larson .................................. 280/736 |
| 3,209,937 | 10/1965 | Hirst .................................. 137/70 X |
| 3,647,109 | 3/1972 | Hebblethwaite .................. 137/69 X |
| 3,698,598 | 10/1972 | Wood .................................. 137/68 R |
| 3,743,318 | 7/1973 | Yamaguchi .......................... 280/737 |
| 3,761,655 | 9/1973 | Whelan ............................. 280/741 X |
| 3,782,401 | 1/1974 | Moore ............................... 137/68 R |
| 3,788,596 | 1/1974 | Maeda ................................. 280/737 |
| 3,900,211 | 8/1975 | Russell ................................ 280/737 |

Primary Examiner—John P. Silverstrim
Attorney, Agent, or Firm—Irving M. Weiner; Pamela S. Burt; Melvin Yedlin

[57] ABSTRACT

An entirely mechanical air bag device for cars wherein a frangible lid seals a container having gas under pressure therein. The frangible lid is supported by a pressing lid in contact with a link mechanism. During a crash, an impact detecting assembly releases the link mechanism which in turn releases the pressing lid which permits the frangible lid to be fractured by the high pressure gas to inflate the bag.

3 Claims, 6 Drawing Figures

AIR BAG DEVICE FOR CARS

BACKGROUND OF THE INVENTION

1. Field of the Invention

This invention relates to air bag devices for automobiles whereby air bags can be entirely mechanically started.

More particularly, the invention relates to an air bag device wherein an opening part of a pressure gas container provided with an opening communicating with an air bag is tightly sealed with a frangible inner lid.

2. Description of the Prior Art

There is already known an air bag device for automobiles which detects the magnitude of an impact at the time of a collision of an automobile to start a gas generator in case the detected value is larger than a set value, to thereby inflate an air bag. The inflated air bag will reduce the impact to which the occupants are subjected, and the device will thus increase the safety of the automobile. Such an air bag device comprises an air bag, a gas generator, gas generation starting means, and impact detecting means. Such known air bag device is generally of an electric fuse type which has many components and much wiring. The wiring and installation must be made very carefully and the cost is high. In addition, wiring breaks and circuit trouble are likely to occur at the time of a collision. Thus, there is also a problem in reliability.

Therefore, in an air bag device it is required that the device for starting the air bag should be actinated at the time of a collision, and should have a structure as simple as possible. It should also have few parts, should be low in cost, should detect an impact, and should operate very quickly on the basis of a detected result. Also, it should inflate the air bag, should be positive in operation, should operate under any conditions, should be high is reliability, and should be able to be easily installed in an automobile by being assembled as a unit without requiring many pipings and wirings.

It is also preferable that the device be entirely mechanical while guaranteeing positive operation. It is also desirable that circuit trouble such as is caused by a long waiting period as in an electric type will not occur. There should be no delay and failure of the operation by the failure of the ignition due to hygroscopicity as in a type using a powder. There should be no need for inspection, replacement, and service of an impact detecting and transmitting system for preventing such delay and failure of operation.

It is also preferable that the gas generator should be so close that the operation of the detecting means may be transmitted directly to it to start the device.

It is also preferable that the device fitting space in the automobile should be as small as possible with respect to other mechanisms there. If the part are many parts and pipes and wiring are required, a large space will be required. If the entire device including the piping and wiring fitting means and starting means is made large, it will not be easy to obtain the fitting space. It should not be necessary to alter the structure of the car body and to move and modify the instruments in the fitting, piping and wiring parts. Therefore, it is preferable to make the device small.

SUMMARY OF THE INVENTION

The present invention provides an air bag device having a container for being charged with gas under pressure. The gas container is provided with an opening portion communicating with an air bag. The device also includes a pressing lid, and a frangible lid disposed between the pressing lid and the gas container. The opening portion of the gas container is tightly sealed by the frangible lid. The frangible lid is supported on one surface thereof by the pressing lid. The pressing lid is provided with an area contacting the frangible lid which is larger than is necessary to prevent fracture of the frangible lid by the gas under pressure. A link mechanism supports the pressure from the pressing lid. An impact detecting means releases the link mechanism when an impact is detected.

An object of the invention is to provide an air bag device for cars wherein an opening part of a pressure gas container provided with an opening communicating with an air bag is tightly sealed with a frangible inner lid. This inner lid is supported on the outside with a pressing lid having a contact area larger than is necessary and sufficient to prevent its fracture. Pressure applied to this pressing lid is supported with a link mechanism. The link mechanism is released by the detection of a collision which exceeds the predetermined threshold.

Another object is to provide an air bag device wherein an opening part of a pressure gas container is interrupted by an inner lid, a sealing plate, and a pressing lid supported by a link mechanism as a valve. The pressing lid is released by the release of a supporting link by a collision detecting means connected to the link mechanism. Upon crashing of the car the inner lid is fractured by the gas pressure, and the air bag is filled with the gas, so that an air bag starting device may be formed to be simple and compact in structure.

Another object is to provide an air bag device wherein a pressing lid pressing and supporting an inner lid is supported with links. The pressure of the pressing lid is supported by the serial multiple links. The connection of the links is released by an impact detecting means. The pressing lid supporting link can be released directly by the detecting means.

A further object is to provide an air bag device wherein an inner lid is supported with a pressing lid in turn supported with a link mechanism. A starting device can be formed mechanically. An impact detecting and a starting operation by a transmitting system can be made quickly and positively due to starting with the link mechanisms. The inflating operation when required of the air bag, together with the pressure gas reaction of the pressing lid, can be made quickly and positively, and the reliability is high.

An object of the invention is to provide together with the above-mentioned objects an air bag device which can be installed in a minimum space without modifying the body and instruments of the automobile and without changing the instrument fitting positions. With the present invention, inspection and replacement is reduced to a minimum.

One embodiment the invention comprises an inner lid such as a sealing plate made of a frangible metallic lamina to be set in a communicating member provided between a pressure gas outlet of a pressure gas container and an inlet of an air bag so as to close this pressure gas passage. A pressing lid is located outside this inner lid, contacting a considerable area on the outside surface of the inner lid and supporting the inner lid to prevent its fracture. A link mechanism supports the pressing lid against the force in the fracturing direction of the inner lid. The link mechanism is released by an impact detecting means upon detecting a crash, and releases the support of the pressing lid. When the support by the link is released, the pressing lid will retreat to open the opening with the fracture of the inner lid and the jetted pressure of the gas, or will pivotally move to open the opening. This opening operation is made quickly and positively. The pressing lid has a supporting member formed separately from, or integrally with it in relation to, the link mechanism. This supporting member or supporting part is locked with the link mechanism started by the impact detecting means. Further, the passing lid is provided with a surface of contact with the inner lid made flat or partly concaved to provide an orifice. In the latter case, when the inner lid is broken by the rise of internal pressure in a fire or the like, the gas will be gradually discharged through the orifice, and the air bag will be prevented from being quickly started and inflated except at the time of a crash. Further, the invention includes means wherein a plate having incisions is applied to the outside surface of the inner lid and is pressed on the outside surface with the pressing lid so that, when the pressing lid is released and the inner lid is fractured, the plate may be turned outwardly through the incisions. Thus, the inner lid is prevented from being flown by the jetting gas, to protect the air bag.

Thus, according to the present invention, the valve mechanism located between the gas container and the air bag to interrupt them from each other can be made as simple and compact as possible. The starting mechanism is simplified by using a link mechanism.

Preferred embodiments of the present invention shall be explained in detail in the following with reference to the accompanying drawings so that further concrete objects and advantages of the present invention may become clear.

DETAILED DESCRIPTION

Figure 1:
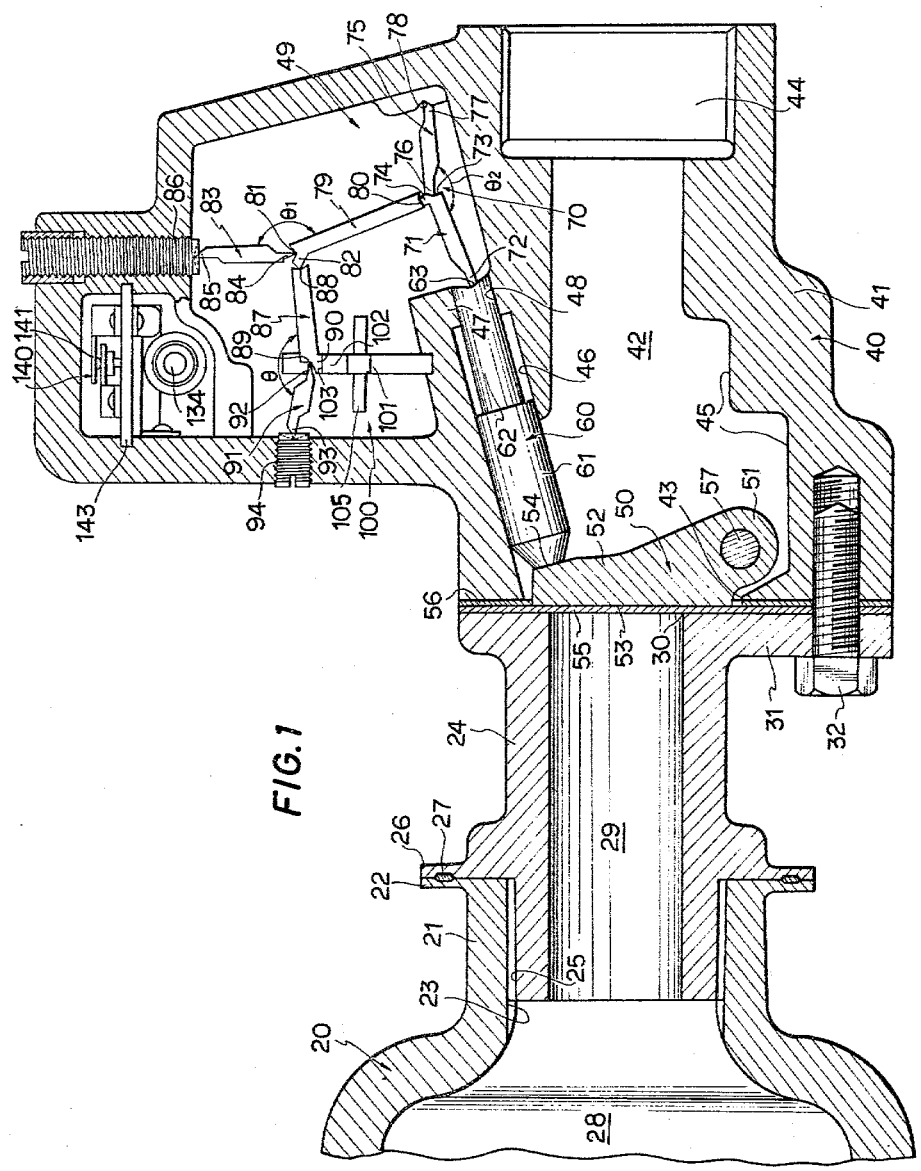
FIG. 1 is a vertically sectioned side view showing a first embodiment of an air bag device according to the invention, illustrating only an interrupting mechanism, a link mechanism, and parts for connecting a gas container with an air bag, the opening of the gas container being interrupted.

FIG. 1 shows the first embodiment of the present invention. The drawing shows a part of a pressure gas container, a member connecting the pressure gas container with an air bag, a pressing lid, a supporting mechanism and a link mechanism. The air bag is not shown in the drawing.

Reference numeral 20 indicates a container charged with a high pressure gas. A flange 22 is formed on the outer periphery of the tip of a small diameter neck 21 extended forwardly of container 20. A screw 23 is formed in the inside diameter part of neck 21. A screw 25 at the base end of a connecting tube 24 is threaded with screw 23 to fasten them together. A flange 26 and flange 22 on the container side are butted to each other, and are welded between them on the entire periphery as shown by 27.

A passage 29 communicating with the space 28 filled with a gas within the container 20 is provided in the inside diameter part of tube 24. A fitting flange 31 is integrally provided on the outer periphery of an opening part 30 at the tip of tube 24.

Reference numeral 41 indicates a body of a starting device 40. The base end part of body 41 is butted to the end surface of flange 31 of tube 24 and is integrally connected through bolts 32 or the like. Body 41 is provided with a passage 42 axially opened at both ends. Passage 42 communicates with passage 29 of tube 24, and is connected in its opening part 44 at its front end to an inlet of an air bag (not shown) through a fitting metal piece or the like. Passage 42 is provided with a recessed step part 45 in the inside diameter part of the base end part. A pin 57 is set across the base end part of this recessed step part. A base 51 of a pressing lid 50 is rotatably pivoted on pin 57.

A pressing surface 53, directed toward opening 30 of tube 24, of the body 52 of lid 50 is formed to be flat, and has an area necessary and sufficient to prevent a later-desired frangible inner lid 55 from being fractured by the gas pressure. Surface 53 in the illustrated embodiment has an area larger than the cross-sectional area of opening 30 of passage 29 of tube 24 forming the opening part of the container 20, and is of a size substantially larger than opening 30. A supporting surface 54 is formed in the tip part of the surface on the side opposite surface 53.

Opening 30 of tube 24 and opening 43 of the base end of passage 42 are opposed to each other, are closed with the inner lid 55 in this part, and are interrupted from each other. Lid 55 is formed of a thin metal plate or the like, and is so frangible as to be instantaneously fractured by the gas pressure within the container. Fracture is prevented by pressing lid 50. Lid 55 is soldered or welded on its left surface to flange 31, and is held on its right surface between the end surfaces in the direction of opening 43. A sealing member 56 is inserted between the held edge side of lid 55 and the peripheral side of opening 43. Lid 55 and sealing member 56 are held by the connection of members 31 and 41 by bolts 32.

When lid 50 interrupts the gas pressure of container 20 as shown in FIG. 1, the lid 50 will press the parts facing the openings 30 and 43 of lid 55 from outside, will press lid 55 against the gas pressure, will prevent lid 55 from being fractured, and will prevent any frame being feed gas into the air bag.

Lid 50 will be kept upright by a stopper 60, and therefore the inner lid 55 will be kept pressed. Stopper 60 is supported in a cylinder 46 formed in the upper part of the part facing opening 43 so that its body 61 may be slidable. The tip part of body 61 contacts the supporting surface 54 of lid 50 to support the lid 50. The rear part of body 61 fits cylinder 46. A rod 62 extended in the rear of body 61 fits a guide hole 48 provided in a partition wall 47 forming the rear end of cylinder 46. The rear end part of rod 62 faces a space in a case 49 provided adjacent to body 41.

Stopper 60 is supported by a link mechanism through the rear end part of rod 62. Stopper 60 supports the force of lid 50 caused by the gas pressure, is held as shown in FIG. 1, and keeps lid 50 closed and raised.

In the illustrated embodiment, mechanism 70 has a set of two divided links, and the links of this set are arranged with an angle between them, and are engaged at the opposed ends with each other. A plurality of such sets are combined to form the link mechanism. In the illustration, the link mechanism is formed of three sets of links.

A V-shaped locking part 63 is formed on the rear end surface facing the interior of case 49 of the rod 72. The engaging tip 62 of one link 71 of the first set engages with locking part 63. An engaging recess 73 at the other end of link 71 engages with an engaging projection 76 on one side of another link 75. A projection 77 on the other side of link 75 engages with an engaging recess 78 formed on the inside wall of case 49. Links 71 and 75 are arranged at an obtuse angle with respect to each other. A projection 74 provided adjacent to recess 73 engages with an engaging recess 80 provided at one end of one link 79 of a second link set. A recess 82 is provided at the other end of link 79 engages with a projection 84 of the other link 83. A projection 85 at the other end of link 83 is engaged and supported with an adjuster 86 provided with an engaging recess for being threaded in and out. A projection 82 adjacent to recess 81 engages with an engaging recess 88 of one link 87 of a third link set. An engaging recess 89 is provided at the other end of link 87, and engages with an engaging projection 92 at one end of the other link 91. An engaging projection 93 at the other end of link 91 is engaged and supported with an engaging recess of an adjuster 94. A flat projection 90 provided adjacent to recess 89 is supported with a flat engaging recessed step part 103 of a pawl 102 of an arm 101 of an impact detecting means or a detection starting means 100.

The above-mentioned links are not fixedly combined with each other, but are in a mere concave-convex engagement. Projections 72, 74, 76, 77, 82, 84 and 92 are formed to be sharp knife-edges, and projections 85 and 93 are formed to be needleshaped.

The set of links 91 and 87 is supported at one end by adjuster 94, at the other end with link 79, and at the engaging part with arm 101 and is so held with an angle $\phi$ so that the movement in the direction in which the angle $\phi$ is reduced may be prevented by arm 101 set in a fixed position. The set of links 83 and 79 is supported at one end with adjuster 86, and the other end with link 71 so that the movement in the direction in which the angle $\phi_1$, made by the links 83 and 79, decreases may be prevented by link 87. The set of links 71 and 75 is supported at one end with the end of rod 62, and at the other end with recess 78 so that the movement in the direction in which the angle $\phi_2$, made by links 71 and 75, decreases may be prevented by link 79.

The pushing force of the gas pressure acting on lid 50 is supported by stopper 60 and mechanism 70. The load on mechanism 70 by the gas pressure is supported by the sets of links 71 and 75, of links 79 and 83 and of links 87 and 91 and arm 101 so that the condition shown in FIG. 1 is maintained unless arm 101 moves in the direction in which the angle $\phi$, made by links 87 and 91, decreases. Lid 50 supports lid 55 against the gas pressure. The positions of the links, i.e., the loads on the respective links, can be adjusted by advancing or retreating adjusters 86 and 94.

In the illustrated embodiment, three sets of link pieces are combined. But there may be two sets, or more than three sets. The link mechanism may also be of a type in which the links are pin-jointed with each other.

Figure 3:
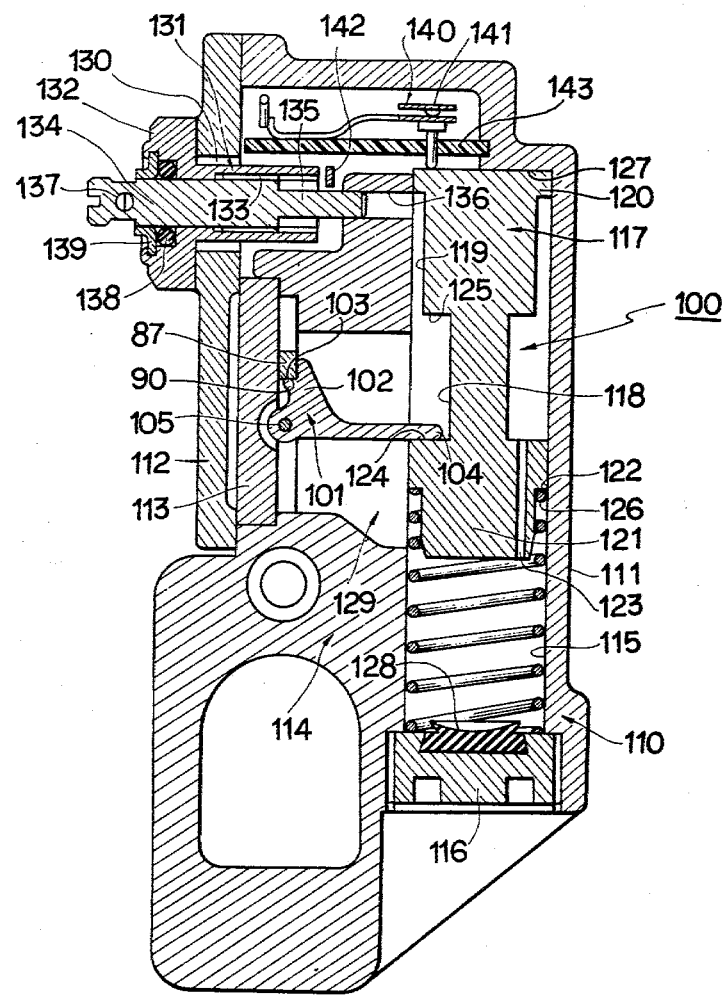
FIG. 3 is a vertically sectioned side view of a crash detecting means including a link mechanism releasing means.

There are various mechanisms whereby mechanism 70 is started, the engagement of the links between link 87 and arm 101 is released, and the resistance to the lid 50 of stopper 60 is released. FIG. 3 shows an example of such a mechanism.

FIG. 3 shows a device 100 wherein the crash detection and the above-mentioned starting are both made by a single device. The device in FIG. 3 is actually set such that the lower side faces in the advance direction of an automobile.

Casing 110 of device 100 comprises a body 111, a lid 112, and a middle lid 113 interposed between them. A cylinder 115 sectioned with a partition wall 114 is provided within body 111. Cylinder 115 is closed at its lower end in the drawing with a plug body 116 which may be threaded. A weight 117 is slidably fitted within cylinder 115. Weight 117 is provided with an annular recess 118 in its intermediate part, and with a more shallow step 119 its upper part. Weight 117 has a stopper 120 sliding in contact with the inside diameter of cylinder 115. Weight 117 is always resiliently pressed upwardly by a spring 126 compressed and fitted between a receiving step 122 in its lower piston 121 and plug 116, and is held in the normal position with stopper 120 in contact with a stopper step 127. Weight 117 has an attenuating orifice 123 formed in the axial direction in its lower piston 121, shoulders 124 and 125 formed in both ends of recess 118, and a sucking disk 128 provided on the inner end surface of plug 116 which forms the lower end surface of cylinder 115.

An arm 101 is rockably pivoted with a pin 105 within body 110. Arm 101 is integrally provided with a detecting part 104 extended into cylinder 115 from a hole 129 provided in wall 114 and a pawl 102 provided with an engaging step 103. Detecting part 104 is in contact with the end surface of shoulder 124 in the normal condition shown in FIG. 3 in which weight 117 is resiliently pressed upward by a spring 126.

A bolt 131 having a through hole is threaded through a screw hole 130 in the part near the upper part of lid 112 shown in FIG. 3, and is inserted except in its head 132 into body 111. A bolt-shaped stopper 134 is threadedly inserted into bolt 131 through a screw hole 133 and is advanced. An engaging part 135 at the tip of stopper 134 is inserted into a hole 136, and is projected into the upper part of cylinder 115. Engaging part 135 is engaged with stopper part 120 to fix the weight so that movement or mis-operation of the weight before the device is installed in an automobile is prevented. After the device is installed, stopper 134 is drawn outwarly, the above-mentioned engagement is released, a head of stopper 134 is projected above head 132, and a split pin 137 is inserted to regulate the advancing movement of stopper 134. Reference numeral 138 indicates a sealing O-ring, and 139 indicates a clip for it. Reference numeral 140 indicates a switch mechanism comprising a switch 141 which is normally on and is switched off by the movement of weight 117, and a switch 142 which is switched off by the advance of stopper 134 and normally on by its retreat. It is provided through an insulating plate 143 in the upper part of body 111.

Link mechanism 70 is connected at an angle with arm 101 of device 100, and is held as shown in FIG. 1.

The operation of starting the air bag device according to the invention is explained as follows.

When an impact at the time of a crash of the automobile is sufficiently great to require an air bag, the weight 117 within cylinder 115 will move in the advance direction of the automobile and downwardly in FIG. 3 against spring 126 due to its inertia force. With the movement of weight 117, the shoulder 125 will push with detecting part 104 to rotate arm 101 clockwise in the drawing with pin 105 as a fulcrum. As a result, the engagement of the engaging step 103 with link piece 87 will instantaneously be released; and the link set will move to reduce the angle $\theta$ made by links 87 and 91 (FIG. 1). With it, the adjacent set of links 79 and 83 will move to be displaced toward link 87 to reduce the angle $\theta_1$. Links 71 and 75 will also move toward link 79 in the direction of reducing the angle $\theta_2$. Because the link sets are connected in series like chains, the above-mentioned movement and displacement will be made instantaneously.

Figure 2:
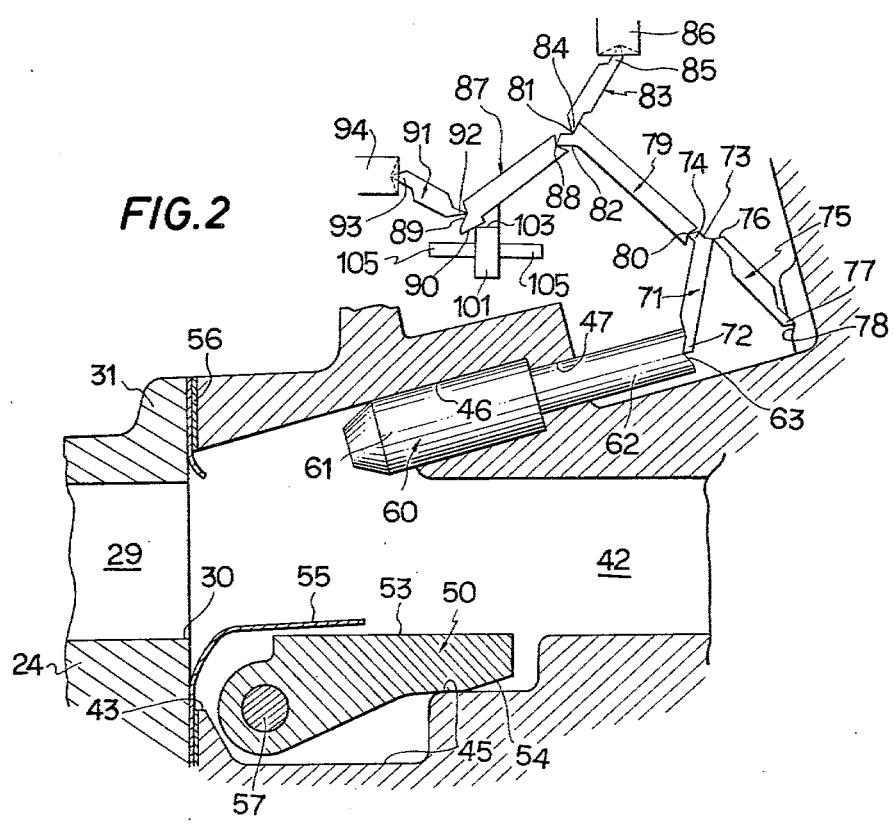
FIG. 2 is a view showing only an essential part of FIG. 1 wherein a pressing lid is opened and an inner lid is fractured to feed gas into the air bag.

Stopper 60 supported by link 71 will lose the reaction acting on link 71 due to the above-mentioned engagement of the link sets, and will move rearwardly in the drawing as guided by cylinder 46 and hole 48 under the influence of the gas pressure exerted on lids 55 and 50. By the release of the support of stopper 61, the lid 50 will be rotated clockwise by the gas pressure acting on lid 55 and will move into recess 45. At the same time, the lid 55 will be fractured by the gas pressure, and the gas in container 20 will be fed into the air bag through the opened opening 30 and 43, passage 42, and outlet opening 44 to inflate the air bag. This condition is shown in FIG. 2.

The frangible inner lid 55 will initially be supported by lig 50 against the gas pressure; the link mechanism will be released by the detecting movement of the crash impact detection starting means; the support to the pressing lid will be released; lid 55 will be fractured by the gas pressure, and the gas will be fed into the air bag. With a link mechanism as described above, the link mechanism can be released instantaneously within a short time such as, for example, about 2 milli-second, and the gas can be instantaneously fed into the air bag, and the bag can be inflated within a short time.

Figure 4:
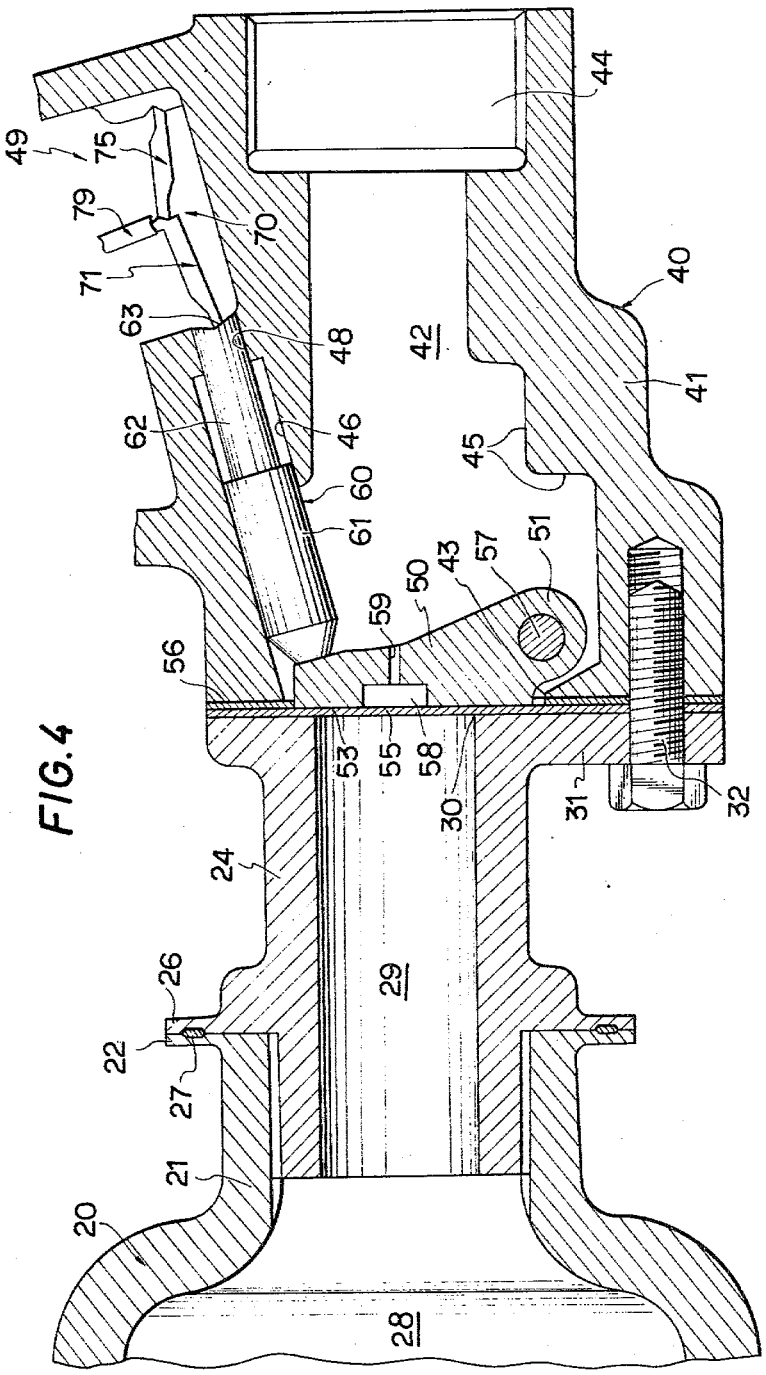
FIG. 4 is a view similar to FIG. 1 but of a modified embodiment.

FIG. 4 shows a modification of the FIG. 3 embodiment. A recess 58 is made in the central part of pressing surface 53 of lid 50 to substantially reduce the area of surface 53 so that surface 53 may be just sufficient to prevent lid 55 from being fractured by the gas pressure. A small hole 59 making the space in recess 58 communicate with passage 42 is made so that, in case the pressure of the high pressure gas within the container 20 becomes abnormally high, the frangible central part of the inner lid may be fractured without fracturing the container 20, and the high pressure gas may be gradually discharged through hole 59. Thus, the air bag can be prevented from being suddenly inflated by an abnormal rise of the gas pressure other than at the time of a crash, thus preventing interference with the operation of the car.

Figure 5:
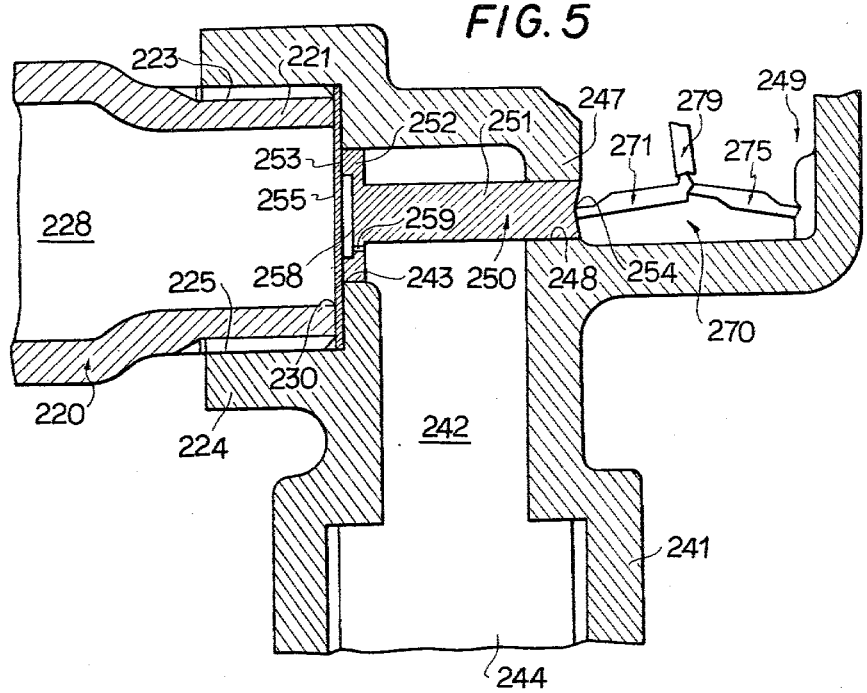
FIG. 5 is a view of a second embodiment of the invention.
Figure 6:
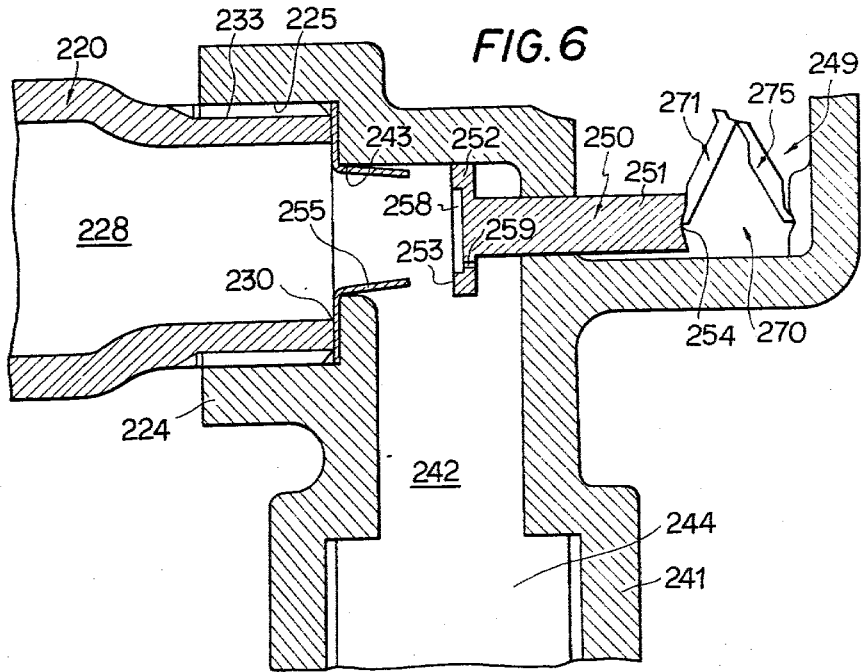
FIG. 6 shows the FIG. 5 device with an inner lid fractured.

Because the outside diameter of body 252 of pressing lid 250 is smaller than the diameter of inlet 243 and the pressing surface 253 presses and contacts only the central part of the outer surface of inner lid 255, the FIGS. 5 and 6 embodiment of the invention will perform a pressure relieving function similar to that performed by recess 58 and hole 59 in FIG. 4. In other words, if the pressure of the high pressure gas within container 220 becomes abnormally high, the frangible outer peripheral part of inner lid 255 may be fractured so as to prevent fracturing of container 220. The high pressure gas will thus be gradually discharged through the annular space defined between body 252 of pressure lid 250 and the inlet 243, and the air bag will be prevented from being suddenly inflated by an abnorml rise in gas pressure other than at the time of a crash, thus preventing interference with the normal operation of the car.

FIGS. 5 and 6 show a modified embodiment of the second embodiment of the invention. This embodiment is fundamentally the same as the second embodiment. The same reference numerals are used for corresponding parts functioning the same.

A recess 258 is made in the central part of surface 253, and communicates with the passage 242 through a small hole 259. The outside diameter of the body 252 is made to closely fit the inlet 243 so that surface 253 reduced by recess 258 may be compensated by the increased diameter to obtain a contact surface preventing fracture of lid 255.

With recess 258 and small hole 259, when lid 255 is fractured by an abnormal gas pressure, the gas will be made to gradually leak through the small hole 259 to prevent the air bag from being accidentially inflated except in a crash. By release of mechansim 270 by the detection of a crash, the pressing lid 250 will be released and the lid 255 will be fractured to feed a high pressure gas into the air bag. This condition is shown in FIG. 6.

The link mechanism can be properly selected, and the impact detecting and link release starting means can be properly selected, without being limited to the above described embodiments.

I claim:
1. An air bag device, comprising:
 a container for being charged with a gas under pressure;
 said gas container including an opening portion communicating with an air bag;
 a pressing lid;
 said pressing lid being provided in a passage connecting said opening portion of said container with an inlet of the air bag;
 a frangible lid disposed between said pressing lid and said gas container;
 said opening portion of said gas container being tightly sealed by said frangible lid;
 said frangible lid being supported on one surface thereof by a pressing surface of said pressing lid;
 said pressing lid being provided with an area contacting said frangible lid which is larger than is necessary to prevent fracture of said frangible lid by said gas under pressure;
 a link mechanism for applying pressure to said pressing lid;
 impact detecting means for releasing said link mechanism; and
 a recess formed in said pressing surface of said pressing lid contacting said one surface of said frangible lid, and provided with a small hole making the space within said recess communicate with said passage.
2. An air bag device according to claim 1, wherein:
 said pressing lid includes a rod member provided integrally extended rearwardly of said pressing lid and supported at the rear end thereof by said link mechanism.
3. An air bag device according to claim 2, wherein:
 said passage connecting said opening portion of said container and said inlet of said air bag has an angle bend therein; and
 said rod member is slidably fitted to said passage and is supported at its rear end by said link mechanism provided outside said passage.

* * * * *